United States Patent
Zhu

(10) Patent No.: US 9,031,135 B2
(45) Date of Patent: May 12, 2015

(54) MULTI-MEDIA SLICING AND TRANSCODING SYSTEM AND STORAGE MEDIUM AND METHOD THEREOF

(75) Inventor: Dingju Zhu, Guangdong (CN)

(73) Assignee: Shenzhen Institutes of Advanced Technology Chinese Academy of Sciences, Guangdong (CN)

( * ) Notice: Subject to any disclaimer, the term of this patent is extended or adjusted under 35 U.S.C. 154(b) by 198 days.

(21) Appl. No.: 13/821,266

(22) PCT Filed: Jul. 19, 2011

(86) PCT No.: PCT/CN2011/077297
§ 371 (c)(1),
(2), (4) Date: Mar. 7, 2013

(87) PCT Pub. No.: WO2012/031506
PCT Pub. Date: Mar. 15, 2012

(65) Prior Publication Data
US 2013/0163675 A1    Jun. 27, 2013

(30) Foreign Application Priority Data
Sep. 7, 2010 (CN) .......................... 2010 1 0275897

(51) Int. Cl.
H04N 21/845 (2011.01)
H04N 21/2343 (2011.01)
H04N 21/442 (2011.01)
H04N 19/40 (2014.01)

(52) U.S. Cl.
CPC ... *H04N 21/8456* (2013.01); *H04N 21/234309* (2013.01); *H04N 21/44209* (2013.01); *H04N 19/40* (2014.11)

(58) Field of Classification Search
None
See application file for complete search history.

(56) References Cited

U.S. PATENT DOCUMENTS

| 2005/0047501 A1* | 3/2005 | Yoshida et al. ............. 375/240 |
| 2008/0119953 A1* | 5/2008 | Reed et al. .................... 700/94 |
| 2010/0153395 A1* | 6/2010 | Hannuksela et al. ........ 707/737 |

FOREIGN PATENT DOCUMENTS

| JP | 2005-176069 A  | 6/2005 |
| WO | 2007125458 A2  | 11/2007 |
| WO | 101420619 A    | 4/2009 |
| WO | 2010005691 A1  | 1/2010 |

OTHER PUBLICATIONS

Communication From the Japanese Patent Office Regarding a Counterpart Foreign Application Dated (Heisei 25) Dec. 27, 2013.

* cited by examiner

*Primary Examiner* — Hung Dang
*Assistant Examiner* — Sunghyoun Park
(74) *Attorney, Agent, or Firm* — Rosenberg, Klein & Lee

(57) ABSTRACT

A multi-media slicing and transcoding method includes: slice the multi-media with a specified unit, to get multiple sections; obtain length of the vague area in section; elongate a redundant length to two opposite ends of each section, wherein the redundant length it equal to the length of the vague area; transcode the sections after elongating the redundant length; cut the elongating redundant length from two opposite ends of each section after transcoding; and piece the sections after cutting together. This invention still provides a multi-media slicing and transcoding system. The multi-media slicing and transcoding method and system eliminate boundary vague area after piecing, and ensure a better effect. Furthermore, this invention still provides a computing storage medium.

18 Claims, 4 Drawing Sheets

MULTI-MEDIA SLICING AND TRANSCODING SYSTEM AND STORAGE MEDIUM AND METHOD THEREOF

FIELD OF THE INVENTION

The present invention relates to multi-media transcoding, and more particularly relates to a multi-media slicing and transcoding system, storage medium and method thereof.

BACKGROUND OF THE INVENTION

Multi-media trancoding includes video transcoding, audio transcoding, image transcoding, and so on. Video transcoding is transferring a compressed coded video stream to another video stream, to ensure the video applying for different network bandwidths, different handling capacity of terminals, and different user's demands. Traditional way of video transcoding does not slice single video, but trancodes the video directly, or trancodes after slicing the video. Slicing means to slice video in time domain and space. For example, slice a video to several parts with a few frames a unit, or slice a frame image to several parts in space. A slicing boundary is produced after slicing the video, the sliced parts can be trancoded parallel, thereafter all the trancoded parts are pieced together to a whole video. Audio transcoding is to transcode after slicing the audio in time domain. While image transcoding is to trancode after slicing the image in space.

Nevertheless, the traditional way of slicing multi-media will cause distortion or vague in the slicing boundary after piece the transcoded parts together, which makes the effect of the multi-media worse.

SUMMARY OF THE INVENTION

It is an object of the present invention to provide multi-media slicing and transcoding system.

A multi-media slicing and transcoding method comprising: slicing the multi-media with a specified unit, to get multiple sections; obtaining length of the vague area in section; elongating a redundant length to two opposite ends of each section, wherein the redundant length it equal to the length of the vague area; transcoding the sections after elongating the redundant length; cutting the elongating redundant length from two opposite ends of each section after transcoding; and piecing the sections together after cutting.

In a preferred embodiment, the step "obtaining length of the vague area in section" comprising: choosing at least two consecutive sections; transcoding the chosen sections; and measuring boundary vague area of the chosen section, to get length of the vague area.

In a preferred embodiment, the step "measuring boundary vague area of the chosen section" comprising: scanning from the boundary to the middle of the section; comparing the sections after transcoding with sections before transcoding.; obtaining parts with conformity between the sections after transcoding and sections before transcoding below a specified value; and defining this part to be boundary vague area of the section.

In a preferred embodiment, the multi-media is video, image, or audio.

Furthermore, it is another object to provide a multi-media slicing and transcoding system.

A multi-media slicing and transcoding system, comprising: a slicing block for slicing the multi-media in a specified unit, to get multiple sections; length obtaining block for obtaining the length of the vague area in each section; elongating block for elongating a redundant length to two opposite ends of each section, wherein the redundant length is equal to the length of the vague area; transcoding block for transcoding the sections after elongating; cutting block for cutting the redundant length from the opposite ends of the transcoded sections; and piecing block for piecing the sections after cutting the redundant length together.

In a preferred embodiment, the step "obtaining length of the vague area in section" comprising: choosing at least two consecutive sections; transcoding the chosen sections; and measuring boundary vague area of the chosen section, to get length of the vague area.

In a preferred embodiment, the step "measuring boundary vague area of the chosen section" comprising: scanning from the boundary to the middle of the section; comparing the sections after transcoding with sections before transcoding; obtaining parts with conformity between the sections after transcoding and sections before transcoding below a specified value; and defining this part to be boundary vague area of the section.

In a preferred embodiment, the multi-media is video, image, or audio.

Furthermore, it is another object to provide 9. One or several computing storage medium.

One or several computing storage medium contains computer instructions, wherein the computer executes the slicing and transcoding a multi-media slicing and transcoding method, the method comprising: slicing the multi-media with a specified unit, to get multiple sections; obtaining length of the vague area in section; elongating a redundant length to two opposite ends of each section, wherein the redundant length it equal to the length of the vague area; transcoding the sections after elongating the redundant length; cutting the elongating redundant length from two opposite ends of each section after transcoding; and piecing the sections after cutting together.

In a preferred embodiment, the step "obtaining length of the vague area in section" comprising: choosing at least two consecutive sections; transcoding the chosen sections; and measuring boundary vague area of the chosen section, to get length of the vague area.

In a preferred embodiment, the step "measuring boundary vague area of the chosen section" comprising: scanning from the boundary to the middle of the section; comparing the sections after transcoding with sections before transcoding; obtaining parts with conformity between the sections after transcoding and sections before transcoding below a specified value; and defining this part to be boundary vague area of the section.

In a preferred embodiment, the multi-media is video, image, or audio.

The multi-media slicing and transcoding method, system and computing storage medium, elongate a redundant length to the two opposite ends of each section, and cut the redundant length before piecing, which ensures the sections after transcoding and piecing with no vague area, to eliminate the boundary ague area. Thereafter, the multi-media after piecing has a better effect, is more natural and more consistent.

DETAILED DESCRIPTION OF THE EMBODIMENTS

The invention will be described in detail with the following embodiments and drawings.

Figure 1:
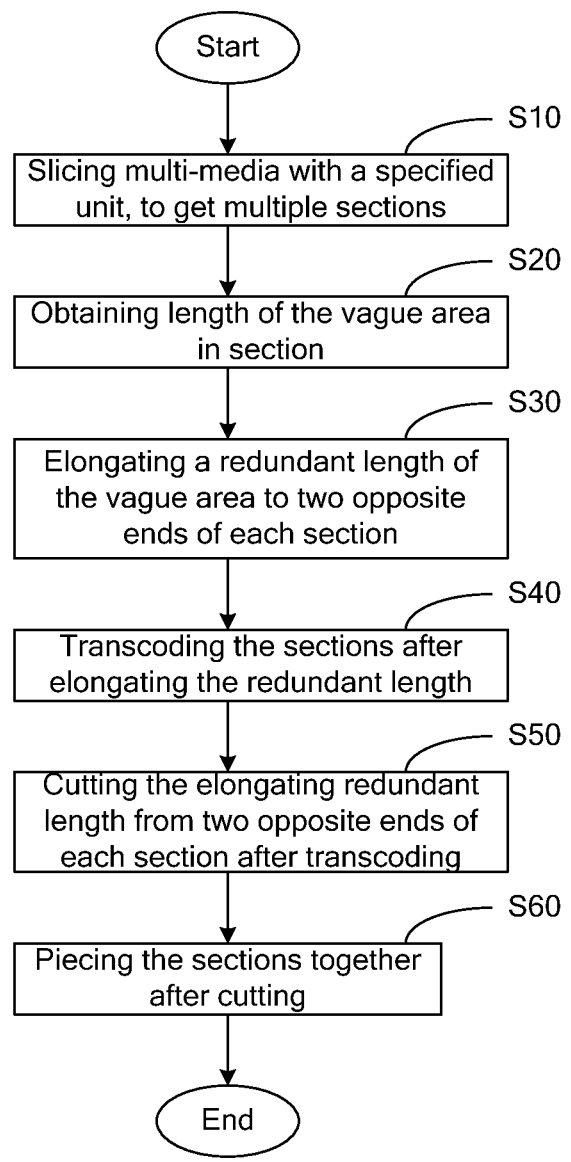
FIG. 1 is a flowchart illustrating an exemplary embodiment of a multi-media slicing and transcoding method.

Referring to FIG. 1, a multi-media slicing and transcoding method includes steps below:

S10, slicing multi-media with a specified unit, to get multiple sections. The multi-media can be video, image, or audio. The video can be sliced in time domain or space, the image can be sliced in space, and the audio can be sliced in time domain. The multi-media is sliced into multiple parts with the same length or the same size, and each parts can be called section.

Figure 2:
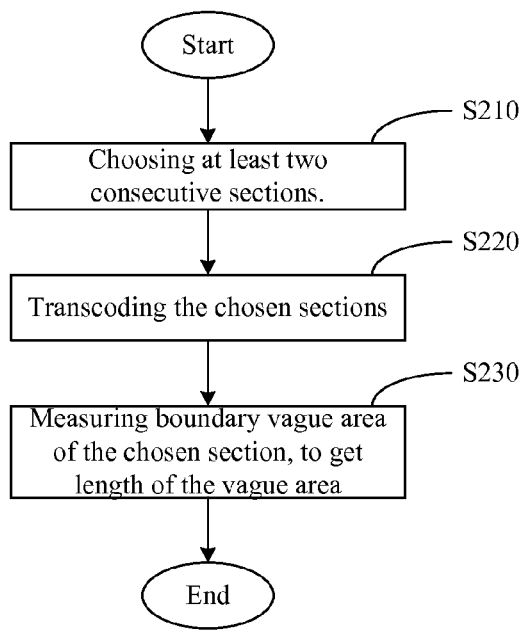
FIG. 2 is a flowchart illustrating method of obtaining length of the vague area in FIG. 1.

S20, obtaining length of the vague area in section. In one exemplary embodiment, referring to FIG. 2, the step S20 includes steps below:

S210, choosing at least two consecutive sections. In the exemplary embodiment, two consecutive sections are chosen to slice. For example, for a video document with 100 frames, to be sliced with two frames a unit, and get 50 sections, then choose the foremost two sections.

S220, transcoding the chosen sections.

Figure 3:
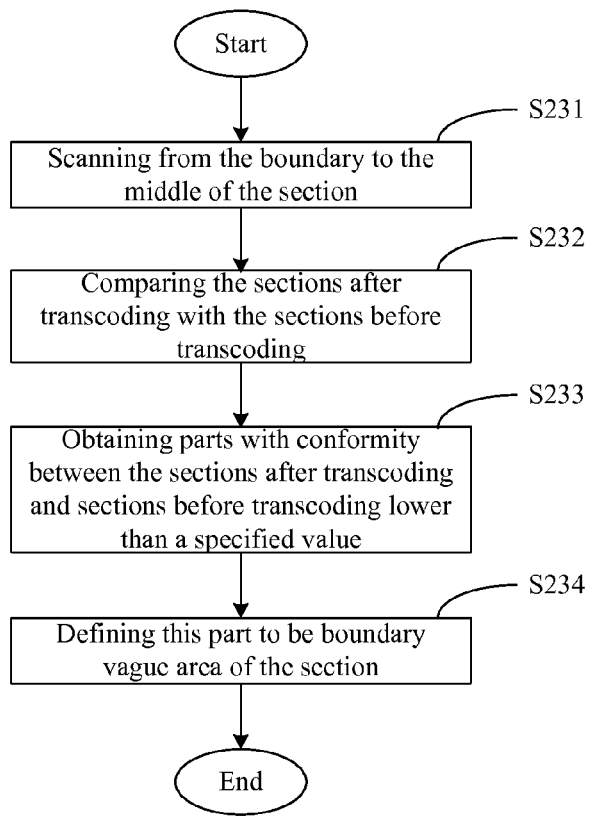
FIG. 3 is a flowchart illustrating method of measuring boundary of vague area in section in FIG. 2.

S230, measuring boundary vague area of the chosen section, to get length of the vague area. In one exemplary embodiment, referring to FIG. 3, the step S230 includes steps below:

S231, scanning from the boundary to the middle of the section. Scan both the sections after transcoding and sections before transcoding. For video and image, it is proper to scan the pixel of the video or the image, and for audio, it is proper to scan audio stream of the audio.

S232, comparing the sections after transcoding with the sections before transcoding.

S233, obtaining parts with conformity between the sections after transcoding and sections before transcoding lower than a specified value. For video and image, slice both the sections after transcoding and sections before transcoding, and compare image picture directly. If the conformity between the sections after transcoding and before transcoding lowers than the specified value, then this part is considered to be vague area, or distortion area. For audio, compare whether these two audio stream are identical to each other, if the conformity between these two audio lowers than the specified value, this part is considered to be vague area.

S234, defining this part to be boundary vague area of the section. Due to scanning from the boundary to the middle of the section, the part closer to the boundary, the conformity is lower; the part away to the boundary, the conformity is higher. Thereafter, the vague area confirmed finally is located in the boundary of the section, to obtain the boundary vague area of the section is to get the length of the vague area.

S30, elongating a redundant length of the vague area to two opposite ends of each section. Which means to elongate length of each section from two opposite ends, and the elongated length is equal to the length of the vague area.

S40, transcoding the sections after elongating the redundant length.

S50, cutting the elongating redundant length from two opposite ends of each section after transcoding. The elongating length part of each section contains less content, which ensures the multi-media to keep the same effect after cutting.

S60, piecing the sections together after cutting. Due to the length of the vague area is cut, and this redundant length part contains less multi-media, piecing sections with no vague area, to achieve the effect of dislodging vague boundary area, to ensure the multi-media a better effect, more natural and more consistent after piecing together.

This invention further provides one or several computing storage medium contains computer instructions, and the computer executes the slicing and transcoding method for multi-media described above.

Figure 4:
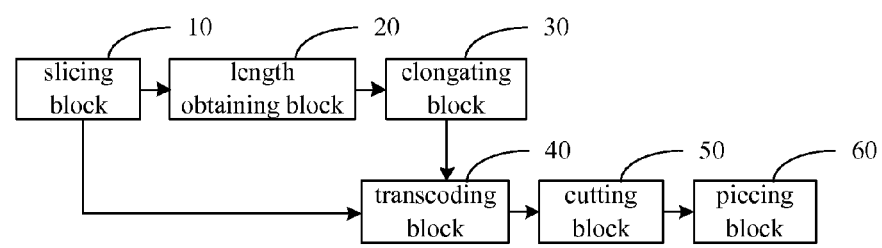
FIG. 4 is a block diagram illustrating one exemplary embodiment of a multi-media slicing and transcoding system.

Referring to FIG. 4, a multi-media slicing and transcoding system includes a slicing block 10, a length obtaining block 20, an elongating block 30, a transcoding block 40, a cutting block 50, and a piecing block 60.

The slicing block 10 is for slicing the multi-media in a specified unit, to get multiple sections. The length obtaining block 20 is for obtaining the length of the vague area in each section. The elongating block 30 is for elongating a redundant length to two opposite ends of each section, the redundant length is equal to the length of the vague area. The transcoding block 40 is for transcoding the sections after elongating. Cutting block 50 is for cutting the redundant length from the two opposite ends of the transcoded sections. The piecing block 60 is for piecing the sections together after cutting the redundant length.

The multi-media can be video, image, or audio. The video can be sliced in time domain or space, the image can be sliced in space, and the audio can be sliced in time domain. The multi-media is separated into multiple parts with the same length or the same size, and these parts can be called sections.

Figure 5:
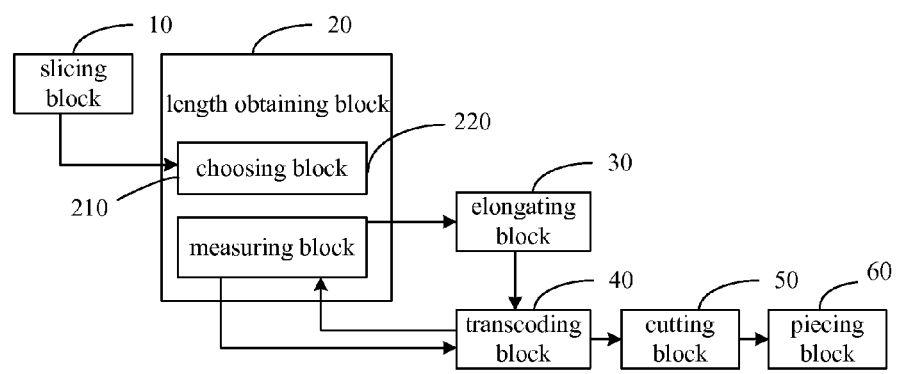
FIG. 5 is a block diagram illustrating another exemplary embodiment of a multi-media slicing and transcoding system.

Referring to FIG. 5, the length obtaining block 20 includes choosing block 210, and measuring block 220.

The choosing block 210 is for choosing at least two consecutive sections. In the exemplary embodiment, two consecutive sections are chosen to slice. For example, for a video document with 100 frames, to be sliced with two frames a unit, and get 50 sections, then choose the foremost two sections.

Figure 6:
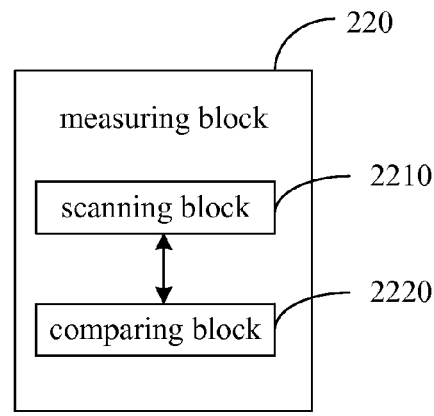
FIG. 6 is a schematic diagram of the measuring block in FIG. 5.

Transcoding block 40 is for transcoding the chosen sections. The measuring block 220 is for measuring the boundary vague area of the chosen section, to get length of the vague area. In one exemplary embodiment, referring to FIG. 6, the measuring block 220 includes scanning block 2210, and comparing block 2220.

The scanning block 2210 is for scanning from the boundary to the middle of the section. The scanning block 2210 scans both the sections after transcoding and sections before transcoding. For video and image, it is proper to scan the pixel of the video or the image, and for audio, it is proper to scan audio stream of the audio.

The comparing block 2220 is for comparing the sections after transcoding with sections before transcoding, and obtaining parts with conformity between the sections after transcoding and sections before transcoding lower than a specified value. For video and image, slice both the sections after transcoding and sections before transcoding, and compare image picture directly. If the conformity between the sections after transcoding and before transcoding lowers than the specified value, then this part is considered to be vague area, or distortion area. For audio, compare whether these two audio stream are identical to each other, if the conformity between these two audio lowers than the specified value, this part is considered to be vague area. Due to scanning from the boundary to the middle of the section, the part closer to the boundary, the conformity is lower; the part away to the boundary, the conformity is higher. Thereafter, the vague area confirmed finally is located in the boundary of the section, to obtain the boundary vague area of the section is to get the length of the vague area.

Figure 7:
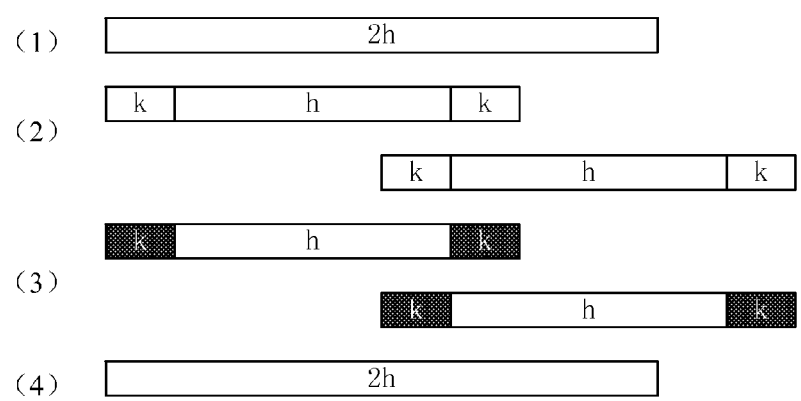
FIG. 7 is a schematic diagram illustrating an exemplary embodiment of multi-media slicing and transcoding.

Take a video for example to illustrate the multi-media slicing and transcoding method and system mentioned above. Due to the same principle of dicing and transcoding between image, audio, and video, taking video for example to describe it. Referring to FIG. 7: (1) before cutting, the length of the video is 2 h, and the video is supposed to cut to two parts, and the length of each part is h; (2) obtain the length of the vague area in each section is k, and elongate a length k to two opposite ends of each section; (3) after transcoding, the elongated length contains less content, and cut the elongated length from each section directly, the longated length is the shadow part shown if FIG. 7; (4) piece the sections after cutting, to get a video which is still 2 h-length. Due to the vague area with k-length is cut, vague area is dislodged, which ensure a better effect after piecing together. In this exemplary embodiment, just take slicing a video into two sections for example, but the principle is applying for slicing a video to multiple sections.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A multi-media slicing and transcoding method comprising:
    slicing the multi-media with a specified unit, to get multiple sections;
    obtaining length of the vague area in section;
    elongating a redundant length to two opposite ends of each section, wherein the redundant length it equal to the length of the vague area;
    transcoding the sections after elongating the redundant length;
    cutting the elongating redundant length from two opposite ends of each section after transcoding; and
    piecing the sections together after cutting.

2. The method of claim 1, wherein the step "obtaining length of the vague area in section" comprising:
    choosing at least two consecutive sections;
    transcoding the chosen sections; and
    measuring boundary vague area of the chosen section, to get length of the vague area.

3. The method of claim 2, wherein the step "measuring boundary vague area of the chosen section" comprising:
    scanning from the boundary to the middle of the section;
    comparing the sections after transcoding with sections before transcoding;
    obtaining parts with conformity between the sections after transcoding and sections before transcoding below a specified value; and
    defining this part to be boundary vague area of the section.

4. The method of claim 3, wherein the multi-media is video, image, or audio.

5. The method of claim 2, wherein the multi-media is video, image, or audio.

6. The method of claim 1, wherein the multi-media is video, image, or audio.

7. A multi-media slicing and transcoding system, comprising:
    a slicing block for slicing the multi-media in a specified unit, to get multiple sections;
    length obtaining block for obtaining the length of the vague area in each section;
    elongating block for elongating a redundant length to two opposite ends of each section, wherein the redundant length is equal to the length of the vague area;
    transcoding block for transcoding the sections after elongating;
    cutting block for cutting the redundant length from the opposite ends of the transcoded sections; and
    piecing block for piecing the sections after cutting the redundant length together.

8. The system of claim 7, wherein the length obtaining block:
    choosing block for choosing at least two consecutive sections; and
    measuring block for measuring the boundary vague area of the chosen section, to get length of the vague area.

9. The system of claim 8, wherein the measuring block comprising:
    scanning block for scanning from the boundary to the middle of the section; and
    comparing block for comparing the sections after transcoding with sections before transcoding, and obtaining parts with conformity between the sections after transcoding and sections before transcoding below a specified value, and defining this part to be boundary vague area of the section.

10. The system of claim 9, wherein the multi-media is video, image, or audio.

11. The system of claim 8, wherein the multi-media is video, image, or audio.

12. The system of claim 7, wherein the multi-media is video, image, or audio.

13. One or several non-transitory computing storage medium contains computer instructions, wherein the computer executes the slicing and transcoding a multi-media slicing and transcoding method, the method comprising:
    slicing the multi-media with a specified unit, to get multiple sections;
    obtaining length of the vague area in section;
    elongating a redundant length to two opposite ends of each section, wherein the redundant length it equal to the length of the vague area;
    transcoding the sections after elongating the redundant length;
    cutting the elongating redundant length from two opposite ends of each section after transcoding; and
    piecing the sections after cutting together.

14. The method of claim 13, wherein the step "obtaining length of the vague area in section" comprising:
    choosing at least two consecutive sections;
    transcoding the chosen sections; and
    measuring boundary vague area of the chosen section, to get length of the vague area.

15. The method of claim 14, wherein step "measuring boundary vague area of the chosen section" comprising:
    scanning from the boundary to the middle of the section;
    comparing the sections after transcoding with sections before transcoding;

obtaining parts with conformity between the sections after transcoding and sections before transcoding below a specified value; and defining this part to be boundary vague area of the section.

16. The method of claim 15, wherein the multi-media is video, image, or audio.

17. The method of claim 14, wherein the multi-media is video, image, or audio.

18. The method of claim 13, wherein the multi-media is video, image, or audio.

* * * * *